Jan. 4, 1966 D. R. OSBORN, JR 3,227,437
ANGLE MEASURING OR INDEXING APPARATUS AND CONSTRUCTION
Filed April 17, 1961
2 Sheets-Sheet 1
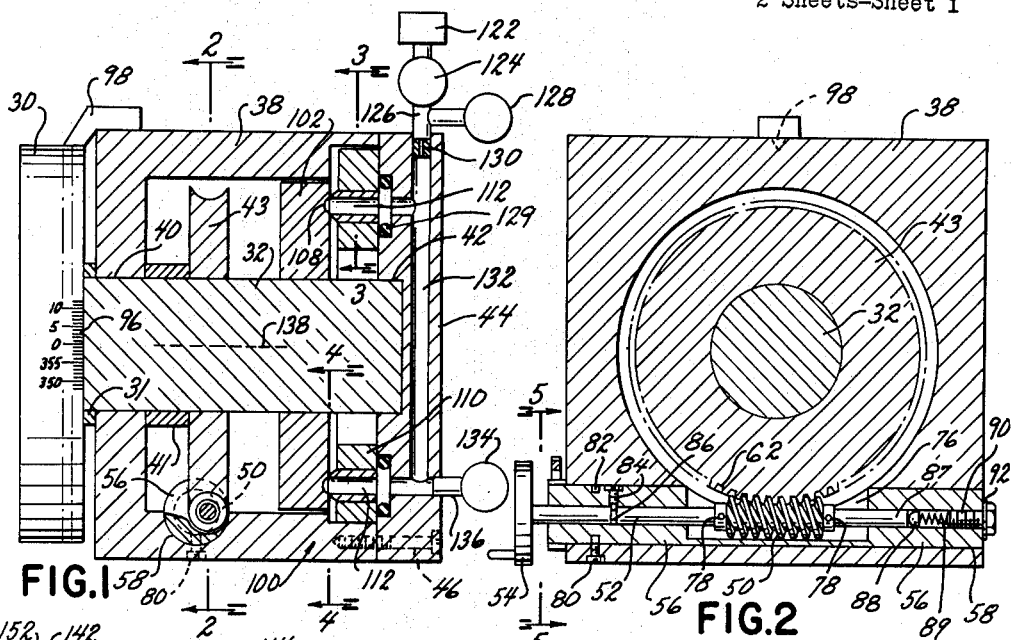
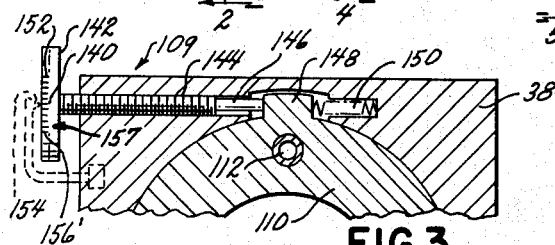
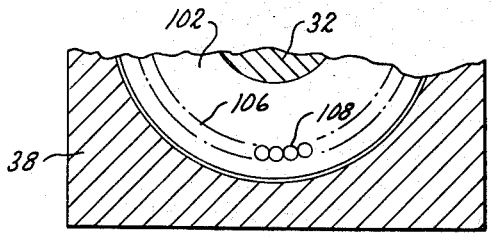
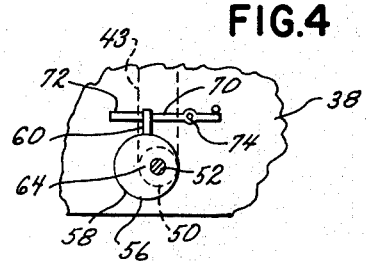
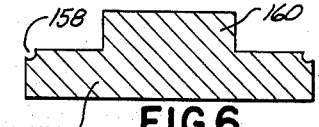
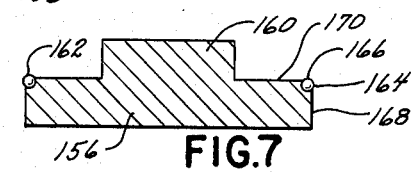
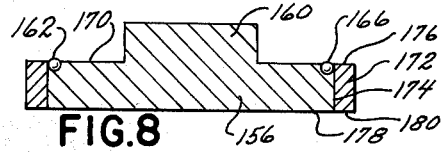
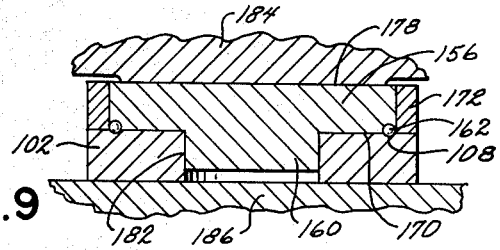
INVENTOR
DON R. OSBORN, JR.
BY Robert R. Candor
HIS ATTORNEY

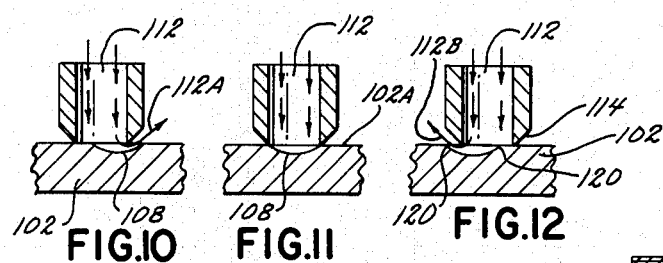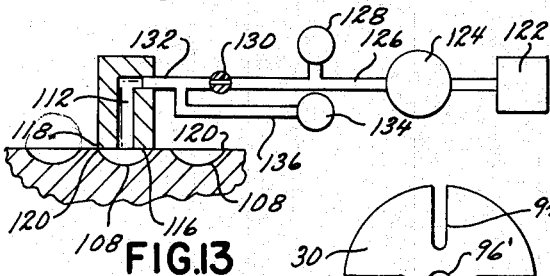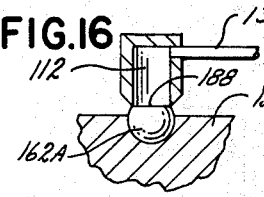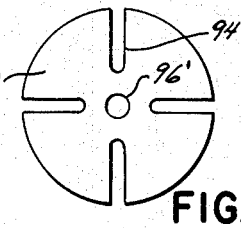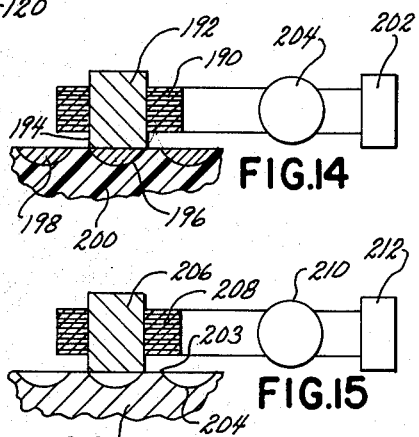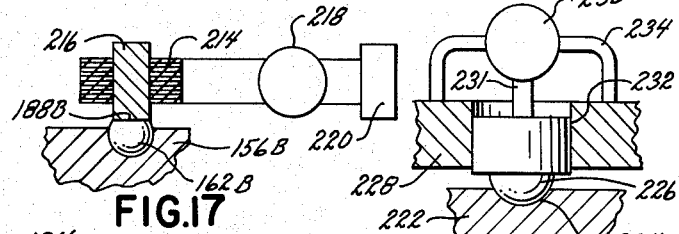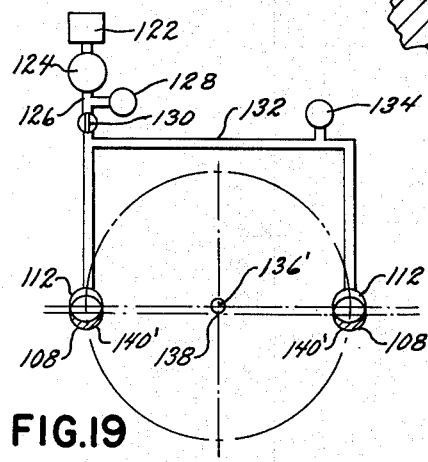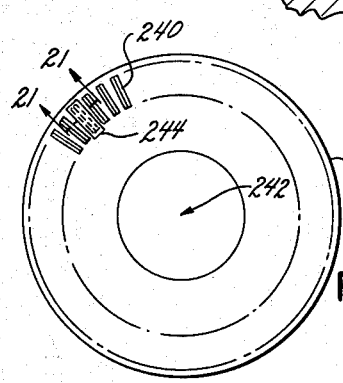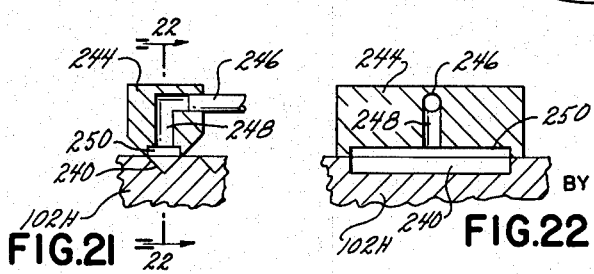

United States Patent Office 3,227,437
Patented Jan. 4, 1966

3,227,437
ANGLE MEASURING OR INDEXING APPARATUS AND CONSTRUCTION
Don R. Osborn, Jr., 1029 Chateau Drive, Kettering, Ohio
Filed Apr. 17, 1961, Ser. No. 103,602
9 Claims. (Cl. 269—63)

This invention relates to the angle measuring or indexing of rotatable article holders and the like.

Rotatable article holders, divider heads, rotatable tables, etc., have been previously made. However, where the angle measuring or indexing means has been made of a precision nature, the cost of such devices has been relatively high.

According to this invention, precision angle measuring or indexing means or members are provided which are efficient, accurate, easily made, and relatively low in cost.

One of the objects of this invention includes the use of a plurality of spheres of small size, but of very accurate tolerances, to provide the actual angle measuring indexing means or member or to produce indentations which in turn are used as the angle measuring indexing means or member for the rotatable article holder and the like.

Another object of this invention is to provide a gas jet system such as an air jet system which may be used in connection with the spherical indexing means herein disclosed or with similar indexing means, in a manner to indicate when the spherical indexing means, or similar indexing means, have been aligned with the air jet or air jets of the air system.

Another object of this invention is to provide a construction in which an indexing plate or the like may be made with a circular groove in which spheres may be placed in close contact and slightly oversize condition. The spheres may then be compacted simultaneously to space them substantially equally distant apart to produce a very accurate indexing means which may be produced at a relatively low cost.

Another object of this invention is to provide indexing means produced by the use of spheres of high precision and relatively low cost, such as the spheres used in ball point pens and the like, which may be purchased with tolerances as close as $10/1,000,000$ of an inch.

Other objects become apparent from this description and/or from the accompanying drawings, in which:

FIGURE 1 is a diagrammatic cross section of a rotary dividing head, table or article holder embodying this invention.

FIGURE 2 is a cross section along line 2—2 of FIGURE 1.

FIGURE 3 is a cross section along line 3—3 of FIGURE 1.

FIGURE 4 is a cross section along line 4—4 of FIGURE 1.

FIGURE 5 is a cross section along line 5—5 of FIGURE 2.

FIGURE 6 is a diagrammatic cross section of an early stage of a plate for assembling a circular row of balls for indexing purposes.

FIGURES 7 and 8 show later stages of the plate of FIGURE 6.

FIGURE 9 is a diagrammatic view of a punch construction for forming an imprint of part of the row of balls of FIGURE 8.

FIGURES 10, 11, and 12 are diagrammatic cross sections of various relative positions and reactions between an air jet and a ball imprint of this invention.

FIGURE 13 is a diagrammatic showing of the relationship between an air jet sensing system and ball imprints produced according to this invention.

FIGURE 14 is a diagrammatic showing of the relationship between an electromagnetic sensing system and ball imprints produced according to this invention.

FIGURE 15 is a diagrammatic showing of another embodiment of this invention somewhat similar to that of FIGURE 14.

FIGURE 16 is a digrammatic showing of another embodiment somewhat similar to the embodiment of FIGURE 13.

FIGURE 17 is a diagrammatic showing of another embodiment somewhat similar to the embodiment of FIGURE 14.

FIGURE 18 is a diagrammatic showing of another embodiment.

FIGURE 19 is a diagrammatic showing of the relationship of a slightly off center segment circle to the jet locations.

FIGURE 20 is a diagrammatic showing of another embodiment of an indexing plate.

FIGURE 21 is an enlarged cross section along line 21—21 of FIGURE 20.

FIGURE 22 is a cross section along line 22—22 of FIGURE 21.

FIGURE 23 is an end view of a typical rotary table which may be used with this invention.

Any type of rotary dividing head, table, article holder, and the like may be used in combination with the indexing means of this invention. FIGURES 1–5 show, diagrammatically, certain parts of a typical rotary article or work holder with which the indexing means of this invention may be used. The well-known components of the work holder are diagrammatically shown, and any refinements may be used in connection with such components. Equivalent components may be used instead, if desired.

For example, a rotatable table top 30 of any well-known construction may be fixedly secured to a rotatable shaft 32 by any suitable means, or may be made integral therewith, so that the table top or work holder 30 is firmly secured to the shaft 32.

The shaft 32 is rotatably held in the casing 38 at the bearing surface 40. In addition, at the final stages of assembly, the shaft 32 is also held in the bearing 42 of the end plate 44, which is secured to the casing 38 by bolts or the like 46, which extend around the casing 38.

An axial limit ring 31 may be pressed on shaft 32 before the shaft 32 is inserted in bearing 40. The shaft 32 may then be inserted from the left of FIGURE 1 into the bearing 40. Another axial limit ring 41 may then be pressed on the shaft 32.

Thereafter, the gear disc 43 and the indexing plate 102 may be pressed on the shaft 32 at proper intervals and eventually the end plate 44 may be placed over the right end of shaft 32.

The shaft 32 may be manually rotated by the worm 50, worm shaft 52 and crank 54. If desired, the worm shaft 52 may be carried by any suitable eccentric bearing construction 56, which has an outer cylindrical surface 58 which may be rotated by the handle 60, clockwise from the position shown in FIGURE 5, so the worm 50 may be moved out of engagement with the worm gear 62 on gear disc 43 to permit the table 30 to be moved quickly by hand or the like for large angle movement, after which the worm 50 may be re-engaged with the worm gear 62 for a more accurate slow motion turning of the worm gear 62.

The worm shaft 52 is eccentrically held in the bearing 56, with respect to the axis 64 of the bearing 56, so that clockwise motion of the bearing 56, in FIGURE 5, moves the shaft 52 downward and with it the worm 50 a sufficient distance to disengage the gear 62.

The handle 60, FIGURE 5, may be held in worm engaging position by means of the holding handle 70 and by the stop member 72. When it is desired to disengage the worm 50 from the gear 62, the stop handle 70 may be moved clockwise about the fulcrum 74, so that the handle 60 and bearing 56 may be moved clockwise in FIGURE 5 to disengage the worm 50 from the gear 62.

If desired, the bearing 56 may be a single cylindrical piece with a central notch 76 cut therein, to accept the worm 50 and the worm gear 62 within the notch 76. The worm 50 may be slidable with respect to the shaft 52, but may be rigidly secured thereto by the sleeve and bolt constructions 78. The bearing 56 may be locked longitudinally by means of a bolt 80 and groove 82, which permits the bearing 56 to be rotated but prevents it from being longitudinally moved. Likewise, the shaft 52 may be locked longitudinally by a bolt 84, and a groove construction 86, to permit rotation but prevent longitudinal movement of the shaft 52.

The end 87 of the shaft 52 may be engaged by a head 88, a spring 89, and a tightening screw or bolt 90 which threadedly engages the sleeve 56 and has a lock washer 92 to hold the bolt 90 in the selected tightened position. By this construction, any longitudinal backlash may be taken up by the spring 89 and bolt 90.

The constructions so far described are such that the rotatable table or article holder 30 may be rotated roughly through a large angle by disengaging the worm 50 from the gear 52 by clockwise rotation of the bearing sleeve 56. Thereafter, the worm 50 may be re-engaged with the gear 62 and then the gear 62 and shaft 32 may be moved slowly and at an accurate rate by means of the handle 54 for a final setting. The table or article holder 30 may be of any suitable construction and may be provided with attaching grooves 94, FIGURE 23, for attaching the articles or work pieces in a well-known manner. The opening 96' may be a centering opening.

The table 30 or article holder 30 may be provided with a degree scale 96 which may have a pointer cooperating therewith anywhere desired and which is indicated by the reference numeral 98.

The worm 50 may be used as a locking device to prevent turning of the table top 30. However, if desired, the worm shaft 52 may be additionally locked by any suitable well-known locking means, not shown, for locking the shaft 52 against accidental rotation after it has been set.

The final or accurate setting is accomplished by the indexing means 100 adjacent the right hand of FIGURE 1. An indexing ring 102 is accurately and firmly pressed on the shaft 32 in as nearly concentric relationship with shaft 32 as possible.

Means are provided to indicate and measure much smaller angles than 1 degree in the turning of the indexing disc 102 and consequently also in the shaft 32 and in the article holder 30. The construction is such that the user may roughly place the article holder 30 at any selected angular setting which is as nearly coincident with the degree markings on the side of the holder 30 and on the scale 96. Thereafter, the finer indexing means 100 are used to set the holder 30 and consequently the work piece to settings much more accurate than the degree markings on the scale 96. In the embodiment of FIGURES 1–5, this finer setting is accomplished by means of a circle 106 of spherical surface segments 108 which have been placed on the indexing plate or disc 102 in a very accurate manner. This circle of spherical surface segments 108 may be measured and centered in a very accurate manner by any one of several setting means which accurately positions the spherical segments 108 at a selected position to settings much more accurate than 1 degree. The setting may be to any desired accuracy, such as from 1/10 of a degree to any desired finer subdivision of a degree, depending on the character of the micrometric construction used at 109, FIGURE 3.

The spherical surface segments 108 may be indentations, as shown in FIGURES 1, 4, 9, 10, 11, 12, 13, etc., or they may be solid spheres or spherical segments, as shown in FIGURES 16 and 17. Either the indentations or the solid spherical segments may be used, and where the description is detailed with respect to the indentations, it is to be understood that the solid spherical segments may be used in a similar manner, if desired.

A micro-setting ring 110, FIGURES 1 and 3, is concentrically and slidably mounted within the casing 38, so that it is concentric with the shaft 32 or as nearly concentric as tolerances permit. The micro-setting ring 110 carries the sensing means to determine when the spherical segments 108 have been aligned with the sensing or measuring devices 112 which are carried by the ring 110 to set the table top 30 to any desired fraction of a degree. In the embodiment of FIGURES 1 through 5 and 10, 11, 12, and 13, the measuring devices 112 may be air jets of substantially the same diameter as the largest diameter 120, FIGURES 12 and 13, of the segments 108. These air jets 112, referring to FIGURES 10, 11, and 12, are placed closely adjacent to the spherical surface segments 108 and closely to the outer flat surface 102A of the indexing plate 102. In FIGURE 11, the air jet 112 is substantially aligned with the spherical surface segment indentation 108. In this position, there is the greatest resistance to any escape of any air in and around the spherical indentation 108. However, when the spherical indentation 108 is slightly to the right, as FIGURE 10, or slightly to the left, as in FIGURE 12, then air escapes, as indicated by the arrows 112A and 112B, respectively. Therefore, means may be provided which are sensitive to the greater resistance to the flow of air, as in FIGURE 11, as compared to the flow of air in FIGURES 10 and 12. For example, an air gauge which is sentitive to the flow of air through the jet 112 may indicate very accurately when the spherical indentation 108 is aligned with the jet 112, as shown in FIGURE 11 and is not aligned, as is shown in FIGURES 10 and 12.

In FIGURES 10, 11, and 12, the jet 112 is shown with a tapered or sharp end 114. However, the end may be flat, as indicated at 116 in FIGURE 13. In this case the outer circumference 118 of the jet 112 is substantially identical with the outer diameter 120 of the indentation 108, so that the jet 112 maintains its highest pressure when the circumference 118 coincides as nearly as possible with the circumference 120 of the identation 108.

Any suitable means of indicating when the spherical segment 108 is aligned with the measuring device 112 or jet 112 may be used. For example, an air system may be used which is highly sensitive to the flow of air or the arrest of air in the jet or jets 112. Such a system is shown in FIGURES 1 and 13, and the description of one is sufficient as a description of the other.

In FIGURES 1 and 13 an air-sensing system is disclosed which is applicable to the sensing jets 112 of FIGURES 1 and 13 and to other air-sensing jets herein disclosed in a manner which is obviously applicable and which therefore is not illustrated with each air jet herein disclosed.

A source of air supply under pressure is indicated at 122, and this may be an automatic electrically driven air pump which maintains a supply of air under pressure between predetermined limits under the control of a well-known pressure responsive switch or the like, not shown. A regulator 124 reduces the pressure of the air supply 122 to a constant pressure in the pipe 126 which pressure is slightly below the lowest limit of air pressure of the air supply 122. For example, the air pressure in 126 may be 30 pounds. An air gauge 128 may be provided for the purpose of indicating the actual pressure in pipe 126 at the time of a measurement. A relatively small orifice 130 permits a slow leakage of air from the pipe 126 to the pipe 132. The pipe 132 may be connected to one or more air jets 112. The air jet or air jets are directed toward the spherical surface segments 108, as indicated in FIGURES 10 through 13. Flexible seals 129 are provided in end plate 44 which permit the jets 112 to move in small arcs with the ring 110, but prevent leakage of air between the ring 110 and plate 44. The leakage of air around the ends of the jets as indicated at 112A and 112B, FIGURES 10 and 12, respectively, permits a rate of air to leak which reduces materially the pressure of air in pipe 132 as compared to the pressure in pipe 126, because the rate of air flow through orifice 130 is not sufficient to prevent a pressure drop in pipe 132. Another air gauge 134 is connected to the pipe 132 by the branch 136 and indicates the pressure prevailing in the pipe 132 at the time of measurement.

When only one air jet 112 is connected to a spherical surface segment 108, as shown in FIGURE 13, the operator may read the gauges 128 and 134 and can determine when the spherical surface segment 108 is aligned as nearly as possible with the jet 112, and this position is the alignment position which is accepted as the best attainable position of the table top 30. When this aligned position is reached, the gauge 134 registers a maximum pressure compared to immediately preceding and subsequent lower pressures, when the circumference 118 coincides as nearly as possible with the circumference 120 of the indentation 108. By comparison with FIGURES 10, 11 and 12, the gauge 134 registers a higher pressure when the jet is in the aligned position of FIGURE 11 as compared with lower pressures when the jet is in the positions of FIGURES 10 and 12.

As will hereinafter become apparent, the spacing of the spherical surface segments 108 around the circle 106 is very uniform and is subject to precision operation. Hence, when the gauge 134 indicates that a particular spherical surface segment 108 is aligned as nearly as possible with a particular jet 112, this indicates that the indexing plate 102, the shaft 32, and the rotatable article holder or table 30 have been positioned with the highest degree of precision attainable for the particular micro-setting at 109, FIGURE 3.

FIGURE 19 shows the air sensing system of FIGURE 1 as applied to a pair of diametrically opposed jets 112 which might be slightly eccentric to the circle 106, FIGURE 4, of the spherical surface segments 108. This slight eccentricity might be brought about when the sensing ring 110 has an axis 136' slightly eccentric to the axis 138 of the indexing plate 102, so that the spherical surface segments 108 on the indexing plate 102 would be correspondingly slightly below the jets 112 on the sensing ring 110, as shown in FIGURE 19. However, the air escape area 140' reaches a minimum when the two jets 112 and the two segments 108 are balanced with respect to each other and are therefore sufficiently close to provide an average reading of the desired micro-setting for the table top 30.

The ring 110 is calibrated or rotatable for a distance of 1 degree total distance or half a degree from the median setting 140 on the micro-adjustment wheel 142, FIGURE 3. The micro-adjustment wheel 142 turns the screw thread 144 and moves its extension 146 toward and away from the lug 148 of the sensing ring 110 slightly to rotate the ring 110 in cooperation with yielding action of the compression spring 150 which acts on the other side of the lug 148. The construction is such that turning of the wheel 142, so graduation 152 is opposite the pointer 154, moves the wheel 110 a half a degree from the median position 140, and turning of the wheel 142 so the graduation 156' is opposite the pointer 154 moves the wheel 110 in the opposite direction for a distance of half a degree from the median position 140. Any intermediate settings of a fraction of a degree are obtainable, depending on the particular type of micrometer construction which is used to be actuated by micrometer wheel 142. Any number of graduations may be provided between the limiting graduations 152 and 156'. In the illustration in FIGURE 3 there are ten spaces. However, any number may be used instead of ten, depending on the accuracy desired.

In addition, other more accurate micro-setting mechanisms may be used to rotate the ring 110, so that settings to 1/50 or 1/100 of a degree are possible, if desired. The wheel 142 may be made rotatable for a plurality of revolutions to actuate a very slow motion mechanism to attain any desired subdivision of a degree for the ring 110.

When the wheel 142 is in the median position 140, opposite the pointer 154, the jets 112, or the jet, if only one is used, are placed in the nearest attainable true unit degree position, so that the operator will know that the table top 30 will be set at a true unit degree setting when the air gauges 134 indicate that the jet or jets 112 have been aligned with the spherical surfaces 108 with the wheel 142 set at 140 opposite the pointer 154.

If the first position of the work held by the table top 30 happens to be a fraction of a degree off a unit position, the operator may turn the micro-wheel 142 until he can align the jets 112 with the segments 108, and this will give the operator the fractional degree reading on wheel 142 which corresponds to the initial position of the work on table top 30.

If the next angular setting of the table top 30 involves a fraction of a degree instead of a unit degree the micro-wheel 142 may be set to provide such fraction of a degree. For example, if the next setting of the table top 30 requires a setting of 5/10 of a degree, the wheel 142 may be set with the graduation 152 opposite the pointer 154. Then when the table 30 is turned the required number of whole degrees, as measured by scale 96, and the additoinal 5/10 degree is provided by calibrating or aligning the air jets 112 with the nearest segment 108 by reading the gauge 134 while slowly turning the table top 30 with the crank 54 until alignment is obtained with the micro-wheel 142 set at 152.

If any other fraction of a degree is desired instead of +5/10, then the micro-wheel 142 may be set with the scale 152–156' set to the desired other fraction of a degree. For example, if a minus 4/10 of a degree is desired, the wheel 142 is set with the graduation 157 adjacent the pointer 154, and then the table top 30 is slowly turned by the handle of wheel or lever 54 to align the jets 112 and segments or indentations 108 with this new setting of the wheel 142.

In using the apparatus of FIGURES 1 through 5, so far described, a work piece is attached to the table or work holder 30, as by bolts being attached to the grooves 94, FIGURE 23, in readiness for work to be performed on the piece. The table 30 may be roughly set to the desired angle for any operation, such as a boring operation and the like, by disconnecting the worm 50 from the worm gear 62 by operating the handles 70 and 60 as heretofore described. This permits the user to turn the table 30 roughly to any position desired in readiness for the work to be done. Thereafter, the worm 50 is engaged with the gear 62 by the operation of the handles 60 and 70 and then the table or work holder 30 is positioned more accurately by the turning of the lever or wheel 54 to impart an accurate slow motion turning movement to the worm gear 62, worm disc 43, the shaft 32, and the table or work holder 30. This turning movement is governed by any sight or other measurements which may be used on the work piece, in relationship to the working tool, such as the boring tool and the like. The micro-wheel 142 is then turned back and forth with the table top 30 stationary until the air gauge 134 indicates that the jets 112 and indentations or segments 108 have been aligned to the greatest accuracy attainable. This is indicated by the highest attainable pressure reading of gauge 134 by such movement. When this position is attained, then a reading of the scale 152–156' of wheel 142 is made in relation to the pointer 154, which indicates to a tenth of a degree how far the setting is from the nearest degree marking on the scale 96 in relation to the pointer 98. (A more accurate subdivision is attainable, as elsewhere described.) Then the reading of the pointer 98 on the scale 96 and the reading of the pointer 154 on the scale 152–156' are recorded for comparison with the next setting for the next desired angle of the table 30 when the next operation is to be performed on the work piece. When the work operation is completed with the initial setting just described for the table 30, then the table 30 is turned by slow motion, by actuation of the handle of wheel 54, if the angle is not to be relatively great. However, if preferred, the worm 50 may be disengaged, as previously described, from the worm gear 62, and the table 30 may be turned to any new angle desired to the nearest degree marking of the scale 96 with respect to the pointer 98. Then the worm 50 is again engaged with the worm gear 62. By computation from the first recorded readings of the scales 96 and 152–156', it can be determined what should be the nearest whole degree reading on the scale 96 and what should be the nearest fractional or tenth degree reading on the wheel 142. The operator makes certain that the scale 96 is set to the nearest desired whole degree with respect to the pointer 98. The wheel 142 is set to the required fractional degree setting of the scale on wheel 142. The operator then observes the gauge 134, and if it is materially below the gauge 128, FIGURE 1, he then turns the handle of wheel 54 back and forth slowly until the gauge 134 reads to the highest attainable reading, which is taken to be a nearest possible alignment of the jet or jets 112 with the spherical surface segments 108. When this high reading of the gauge 134 is attained, it is known that the work has been placed in the new desired angular position with respect to the original position to the highest attainable accuracy. The second operation may be performed on the work at the correct angle with respect to the first operation. Thereafter, any number of subsequent angular settings may be made for the table 30, and the work held thereon, by computation of the angle necessary to be read on the scales 96 and on the wheel 142 to obtain any other desired angular positions of the work piece.

The method of making the flat body or indexing plate or disc 102 with a plurality of equally spaced spherical surface segments 108 within the circle 106 will now be described particularly with reference to FIGURES 6 through 9.

Referring to FIGURES 6 through 9, an annular grooved die 156 is provided with an annular or circular groove 158 wich may be cut in the die 156 very accurately by reference to the pilot diameter extension 160. The extension 160 may conveniently be of the same diameter as the main body of the shaft 32. The groove 158 may be a partial groove, so that when a plurality of spheres 162 are placed in the groove 158, as shown in FIGURE 7, side segments 164 and top segments 166 extend beyond the cylindrical surface 168 and the flat surface 170 respectively. Preferably the diameter of the groove 158 is chosen so that a desired number of spheres 162 will be snugly held in the groove 158 with a slight oversize or outward bulge so that the spheres 162 are infinitesimally slightly outwardly bulged from the walls of the groove 158. When degree markings are to be used as the basic scale, the groove 158 may be made so that it will receive 360 spheres 162 with the slight over-size bulge just described.

Spheres or balls 162 of precision size and diameter may be obtained on the market at a relatively low cost. For example, steel balls or spheres which are commonly used in ball point pens may be used for the practice of this invention. These balls may be 1 millimeter in diameter, and these balls are manufactured to within $10/1,000,000$ of an inch tolerance from a true spherical form. When balls of this diameter are used, then the ring or groove 158 may be approximately 4 9/16 inches in diameter. Preferably the groove 158 will be gradually cut, so that the balls may be tried out within the groove 158 until the exact depth of the groove 158 is obtained to provide the desired bulge to produce the segmental protrusions 164 and 166 of FIGURE 7. The balls may be made of relatively hard metal such as steel and the like so they are capable of producing the indentations 108 in plate 102 without disfiguration.

After the groove 158 has been properly cut and the spheres 162 have been placed therein, as shown in FIGURE 7, then a ring 172, with a flat cylindrical inner side 174, may be pressed over the cylindrical surface 168 by a hydraulic press or the like, or the ring 172 may be heated and placed around the die 156, so that the ring 172 is heat shrunk around the die 156, as shown in FIGURE 8, with the ring top surface 176 substantially in alignment with the top surface 170 of the die 56. This construction may be obtained by making the distance between the die surfaces 170 and 178 substantially equal to the distance between the ring surfaces 176 and 180.

When the ring 172 has been pressed or has cooled to the desired temperature, the assembly shown in FIGURE 8 may be inverted to the position shown in FIGURE 9, with the die surface 178 on top and with the die surface 170 at the bottom. The unmarked, flat pilot ring or indexing plate 102 has an inner diameter 182 substantially equal to the outer diameter of the shaft 32 and of the outer diameter of the pilot diameter extension 160 with a close tolerance fit, so that the ring 102 may subsequently be removed from the extension 160. The ring 102 and die 156 are placed between the upper press member 184 and the lower press member 186 of a hydraulic press or the like. The members 184 and 186 are moved toward each other with sufficient force to cause the spheres 162 to produce indentations or spherical surface segments 108 of the desired depth, as heretofore described. The plate 102 may be of softer metal, if desired. The indentations produced in the ring 102 may be of any desired depth, such as any desired fraction of the radius of spheres 162.

If desired, the top surfaces of the spheres 162, in FIGURE 8, may be partially ground off to produce flat surfaces (similar to 188 in FIGURE 16). Then the die 156 with these flattened surfaces may be used to make spherical segmental indentations in the ring or plate 102 of FIGURE 9, with the bottoms of the segmental indentations flattened instead of spherical. This permits formation of relatively large diameter segments without deep indentations, and prevents possible distortion of the plate 102.

The ring 102 of FIGURE 9 may be removed from the die 156 after the indentations 108 have been made in the ring 102. Thereafter, the ring 102 may be used as an indexing plate in any and all of the embodiments shown in FIGURES 1 through 5, 10 through 15 and 18.

The spherical surface segments may also be used as solid spheres or spherical segments, instead of indentations. For example, a ring similar to the die 156 of FIGURE 6 may be made. However, instead of a pilot diameter extension 160, an opening may be made in the member 156 which extends completely through the member to form a flat ring generally similar to the opening 182 of the ring 102, FIGURE 9. Thereafter, the spheres 162 may be placed in the groove 158 in a manner similar to FIGURE 7, and, thereafter, a ring 172 may be shrunk or pressed around the circumference of the ring, to lock the spheres 162 in place. Such a ring or a portion thereof is shown as 156A in FIGURE 16 and as 156B in FIGURE 17.

If desired, the spheres 162A of FIGURE 16 may be ground off and flattened at 188 to produce circular flat segmental surfaces which cooperate with a jet or jets 112 similarly to the jets heretofore described and which are connected to an air pipe system 132 and the remainder of the sensing air system, such as shown in FIGURES 1 or 13, for the purpose of centering or indexing the ring 156A. The diameter of the surface 188 may be substantially equal to the discharge opening of the jet 112. Any slight sidewise movement of the flat segmental surface 188 permits air to escape out of the sides of the jet 112 of FIGURE 16 in a manner somewhat similar to that of FIGURES 10–12, and thus permits a gauge similar to 134 to indicate when the surface 188 is out of alignment or has been aligned with the jet 112.

Any other type of sensing system may be used to cooperate with the spherical surface segments 108, etc., to position the ring 102 or other body in which the segments are placed. For example, in FIGURE 14, an electromagnetic system may be used. An electromagnet 190 may be provided with a core 192 of magnetically permeable material which has an outer circular end 194 substantially of the same diameter as the spherical surface segments or indentations 196, in FIGURE 14. The indentations 196 may be filled with magnetically permeable material 198, and the plate or ring 200, which is similar to ring 102, may be made of non-magnetic material, such as bronze, rubber, and the like. The magnetically permeable material 198 may be made of iron particles embedded in glue or the like, which are applied in the indentations 196 to form flat surfaces, as shown in FIGURE 14. The electromagnet 190 may be connected to a source of high frequency alternating current 202 and to a reactance measuring device 204, or other measuring device, which is sensitive to the effect of the additional magnetic material 198 when it is aligned with the magnetic core or armature 192. The construction indicates the alignment or substantial alignment of the armature 192 and recesses 196 in a somewhat similar manner to that with respect to the air-jet systems heretofore described. The alternating current may be of a frequency of from 600 to 1000 cycles per second. The device 204 may be placed in parallel with the magnet 190 or in series or in any other proper relationship whereby the variations in reactance are indicated in the device 204, as is well known in the electrical art. In general, the highest reactance will be registered when the segment 196 is as near as possible on center with respect to the armature 192.

In FIGURE 15, the ring 202, which is otherwise similar to ring 200, may be made of magnetically permeable material and the indentations 204 may be made of a size such that their largest diameter 203 aligns with the magnetic core 206 of the electromagnet 208. The magnet 208 may be connected to a measuring device 210 and with a source of alternating current 212 somewhat in the same manner as disclosed in connection with FIGURE 14. However, the measuring device 210 indicates that the reactance is the least when the spherical impression 204 is aligned with the magnetic core 206.

In FIGURE 17, a solid spherical segment 162B is embedded in a plate 156B somewhat similar to the disclosure in FIGURE 16. A flatter surface 188B is provided. An electromagnet 214 has a magnetic armature 216 which may be aligned with the surface 188B and may be of substantially the same diameter as that of surface 188B. The sphere 162B may be magnetically permeable in character, whereas the ring 156B may be non-magnetic, such as of bronze, rubber, and the like. The electromagnet 214 may be connected to an indicating device 218 and to a source of alternating current 220 of the type heretofore described in connection with FIGURE 14.

The action of the construction shown in FIGURE 17 is believed to be substantially similar to that described in connection with FIGURE 14 and hence such description is not here repeated.

The magnetically permeable material at 198, 202, 162A, and 162B preferably is of the character which receives and loses its magnetism quickly and easily, such as soft iron and the like.

In FIGURE 18 a disc 222, similar to disc 102, is provided with indentations 224 similar to indentations 108 heretofore described. It rotates about an axis in a manner similar to FIGURE 1. A movable plunger 226, with rounded end, is biased by a spring or the like toward the indentations 224 and moves in and out of the indentations 224 as they pass the stationary construction or ring 228, which may be somewhat similar to ring 110 of FIGURE 1. The plunger 226 actuates an indicator 230 by movable shaft 231, and the indicator 230 indicates when the plunger 226 reaches its lowest position with respect to FIGURE 18. The plunger 226 is slidable within a hole 232 in ring 228, which ring also holds the indicator 230 by means of the supports 234.

The air system of this invention may also be used with substantially rectangular grooves or other indentations 240, FIGURES 20–22, which may be cut in a plate 102H, which otherwise may be similar to the plate 102 of FIGURE 1. The radial indentations 240 may be cut by a diamond or the like and may be radial with respect to the axis 242 of the shaft corresponding to 32. A rectangular air jet 244 may have a rectangular air passage 250 slightly larger than indentations 240, and may be fed by air pipe 246, which pipe 246 may be connected to an air system substantially the same as in FIGURES 1 or 13. The passageway 248 of the jet is connected to the rectangular passageway or jet 250, which may be aligned with the rectangular grooves 240 by the turning of ring 102H in a manner similar to ring 102 of FIGURES 1–5 to indicate proper positioning of a table top such as table top 30 of FIGURE 1. When the ring 102H moves the grooves 240 slightly to the right or left of the jet 250, FIGURE 21, then air escapes through a relatively long slit formed on either side of groove 240. This long slit produces a relatively sharp drop in the air pressure in pipe 246, and hence produces a quick indication in an air gauge corresponding to 134 of FIGURES 1 and 13.

All of the embodiments herein disclosed may be applied to divider heads similar to that disclosed in FIGURES 1–5 and their operation is similar to that described in connection with said FIGURES 1–5. Detailed description is therefore not repeated.

It is thus to be seen that an efficient, simple and relatively inexpensive construction has been provided by this invention.

While the form of the invention now preferred has been disclosed according to the requirements of the statutes, other forms may be used, all coming within the scope of the claims which follow.

What is claimed is:

1. In combination: a rotatable work holder; an indexing plate having a circle of substantially equally spaced spherical surface segments; and means responsive to relative rotational movement of said work holder and cooperating with said segments to index a selected angular position of said work holder and in which said means includes a jet system with a jet of air directed toward said plate.

2. In combination: a device with rotational angular positions to be measured; an indexing plate having an arc of substantially equally spaced indentations each surrounded by a flat surface; and a jet system with a jet directed toward said plate responsive to relative rotational device and cooperating with said indentations as they pass said jet to index a selected, angular position of said device and in which each of said indentations has an exposed area and said jet system includes a jet discharging toward said indentations said jet having a discharge face substantially of the same area as the exposed area of said indentations and in which said jet system includes a constant pressure source with a pressure responsive indicator to indicate when said jet is aligned with one of said indentations.

3. In combination: a device with rotational angular positions to be measured; an indexing plate having an arc of substantially equally spaced indentations each surrounded by a flat surface; and a jet system with a jet directed toward said plate responsive to relative rotational movement of said rotational device and cooperating with said indentations as they pass said jet to index a selected, angular position of said device and in which the jet system includes a plurality of jets connected to a common supply and common gauge.

4. An angle measuring member having a flat surface with a circle of substantially equally spaced spherical surface segments for use in indexing a rotatable holder and the like, said segments coincidable with segments of complete spheres which have their centers in said circle and have their mutually adjacent sphere surfaces of said complete spheres touching each other in said circle, and in which said spherical surface segments are segmented spherical protrusions extending from said surface.

5. A member according to claim 4 in which said member includes a circular plate with a sphere receiving groove adjacent its edge in which a plurality of complete spheres are snugly held side by side and with a sphere holding ring tightly positioned around said circular plate to hold said spheres in said groove, said spheres being flattened to produce said segmented spherical protrusions.

6. A member according to claim 5 in which said spheres are flattened to produce equal flat circular segmental surfaces, and in which member jet means is provided having a jet with a circular surface having the same diameter as said flat circular segmental surfaces, and past which jet said segmental surfaces are relatively movable.

7. An angle measuring member having a flat surface adjacent an arc of a circle, said flat surface having a plurality of equally spaced spherical surface segments arranged in said arc of a circle and the surfaces of which segments can coincide with the surfaces of a plurality of equally spaced spheres, which spheres have their centers in said circle and have their adjacent spherical surfaces touching each other and in which said spherical surface segments are segmented spherical protrusions extending from said flat surface and with said segments having flat surfaces parallel to said first-named flat surface.

8. An angle measuring member having a flat surface adjacent an arc of a circle, said flat surface having a plurality of equally spaced spherical surface segments arranged in said arc of a circle and the surfaces of which segments can coincide with the surfaces of a plurality of equally spaced spheres, which spheres have their centers in said circle and have their adjacent spherical surfaces touching each other and in which said segments have circular measuring rings of the same diameter and in which a circular jet is adjacent said segments with a circular discharge wall substantially of the same diameter as said rings and past which said rings relatively move, and a pressure gauge connected with said jet.

9. A member according to claim 8 in which a plurality of said jets are connected to a common supply and gauge and past which jets said rings relatively move to provide an average reading in said gauge.

References Cited by the Examiner
UNITED STATES PATENTS

| | | | |
|---|---|---|---|
| 936,832 | 10/1909 | Thompson | 269—69 |
| 1,278,607 | 9/1918 | De Forest | 269—8 X |
| 1,365,344 | 1/1921 | Rosenberg | 269—64 X |
| 2,495,438 | 1/1950 | Bentley et al. | 269—70 |
| 2,536,239 | 1/1951 | Tyndell | 269—70 |
| 2,538,640 | 1/1951 | Click | 269—71 |
| 2,564,566 | 8/1951 | Duffy | 269—71 |
| 2,766,512 | 10/1956 | Hatebur | 29—148.4 |
| 3,015,483 | 1/1962 | Martin | 269—70 X |
| 3,026,601 | 3/1962 | Potter | 29—148.4 |
| 3,048,059 | 8/1962 | Cross | 74—819 |

ROBERT C. RIORDON, *Primary Examiner.*
DAVID J. WILLIAMOWSKY, *Examiner.*